(12) United States Patent
Thomas

(10) Patent No.: US 12,545,332 B1
(45) Date of Patent: Feb. 10, 2026

(54) MUD FLAPS, MUD FLAP KITS, MUD FLAP ACCESSORIES, AND METHODS OF MAKING AND USING THE SAME

(71) Applicant: Darrell Thomas, Anahuac, TX (US)

(72) Inventor: Darrell Thomas, Anahuac, TX (US)

( * ) Notice: Subject to any disclaimer, the term of this patent is extended or adjusted under 35 U.S.C. 154(b) by 260 days.

(21) Appl. No.: 18/500,241

(22) Filed: Nov. 2, 2023

Related U.S. Application Data

(60) Provisional application No. 63/421,721, filed on Nov. 2, 2022.

(51) Int. Cl.
*B62D 25/18* (2006.01)
*B62D 25/16* (2006.01)

(52) U.S. Cl.
CPC ......... *B62D 25/188* (2013.01); *B62D 25/161* (2013.01)

(58) Field of Classification Search
CPC .. B62D 25/188; B62D 25/161; B62D 25/163; B62D 25/165; B62D 25/166; B62D 25/168; B62D 25/182; B62D 25/184; B62D 25/186
See application file for complete search history.

(56) References Cited

U.S. PATENT DOCUMENTS

| | | | | | |
|---|---|---|---|---|---|
| 2,605,119 | A | * | 7/1952 | Earnest | B62D 25/184 280/848 |
| 2,699,955 | A | * | 1/1955 | Eaves | B62D 25/188 280/851 |
| 3,088,751 | A | * | 5/1963 | Barry | B62D 25/188 280/851 |
| 4,361,606 | A | * | 11/1982 | Butler | B62D 25/188 264/171.23 |
| 4,832,356 | A | * | 5/1989 | Liberto | B62D 25/168 280/851 |
| 4,877,266 | A | * | 10/1989 | Lamparter | B60R 19/565 293/118 |
| 5,269,547 | A | * | 12/1993 | Antekeier | B62D 25/188 280/154 |
| 5,582,430 | A | * | 12/1996 | Bauer | B62D 25/188 428/116 |
| 6,013,351 | A | * | 1/2000 | Mahn, Jr. | B62D 25/18 428/323 |
| 6,394,475 | B1 | * | 5/2002 | Simon | B62D 25/188 280/847 |

(Continued)

FOREIGN PATENT DOCUMENTS

| | | | | |
|---|---|---|---|---|
| DE | 102008021309 A1 | * | 10/2009 | ........... B62D 25/188 |
| EP | 0125072 A2 | * | 11/1984 | ........... B62D 25/168 |

(Continued)

*Primary Examiner* — James A Shriver, II
*Assistant Examiner* — Ian Bryce Shelton

(57) ABSTRACT

Mud flaps having one or more decorative and functional accessories attached to the mud flaps, mud flap kits for forming decorative and functional mud flaps, and mud flap accessories suitable for use with and attachment to mud flaps are provided. Methods of making decorative and functional mud flaps, mud flap kits for forming decorative and functional mud flaps, and mud flap accessories are also provided. Methods of using decorative and functional mud flaps, mud flap kits for forming decorative and functional mud flaps, and mud flap accessories on mud flaps, for example, on a truck having 18 wheels, are also provided.

19 Claims, 9 Drawing Sheets

(56) References Cited

U.S. PATENT DOCUMENTS

| | | | | |
|---|---|---|---|---|
| 6,729,652 B2* | 5/2004 | Cicansky | ............. | B62D 25/188 280/847 |
| 6,955,369 B1* | 10/2005 | Schiebout | ................ | B60D 1/58 280/154 |
| 8,408,601 B1* | 4/2013 | Miranda | ................ | B62D 25/18 280/847 |
| 8,465,058 B1* | 6/2013 | Herrera | ................ | B62D 25/188 280/847 |
| 9,016,912 B1* | 4/2015 | Gustafson | ............ | B60Q 1/0088 362/500 |
| 9,284,000 B1* | 3/2016 | Smith | ................ | B62D 25/188 |
| 9,598,117 B1* | 3/2017 | Hilburn | ................ | B62D 25/188 |
| 10,023,242 B1* | 7/2018 | Wurzer | ................ | B62D 25/188 |
| 10,183,703 B2* | 1/2019 | Jaeger | ................ | B62D 25/161 |
| 2002/0043797 A1* | 4/2002 | Cicansky | ............. | B62D 25/188 280/847 |
| 2002/0056985 A1* | 5/2002 | Szakurski | ............ | B62D 25/168 280/847 |
| 2008/0129031 A1* | 6/2008 | Nelsen | ................ | B62D 25/18 280/851 |
| 2009/0134614 A1* | 5/2009 | Johnson | ............... | B62D 25/188 280/847 |
| 2010/0059982 A1* | 3/2010 | Schubert | ................ | B62D 25/18 280/851 |
| 2011/0204614 A1* | 8/2011 | Cicansky | ............. | B62D 25/18 264/138 |
| 2013/0049320 A1* | 2/2013 | Smith | ................ | B62D 25/188 280/154 |
| 2017/0096176 A1* | 4/2017 | Iordanou | ................ | B05B 12/20 |

FOREIGN PATENT DOCUMENTS

| | | | | |
|---|---|---|---|---|
| GB | 138410 A | * | 2/1920 | ........... B62D 25/186 |
| GB | 2227985 A | * | 8/1990 | ........... B62D 25/168 |
| GB | 2573162 A | * | 10/2019 | ............ B62D 25/18 |
| WO | WO-9419228 A1 | * | 9/1994 | ........... B62D 25/188 |

* cited by examiner

MUD FLAPS, MUD FLAP KITS, MUD FLAP ACCESSORIES, AND METHODS OF MAKING AND USING THE SAME

CROSS-REFERENCE TO RELATED APPLICATIONS

This patent application is a U.S. Utility Patent Application, which claims the benefit of priority to U.S. Provisional Application Ser. No. 63/421,721, filed on Nov. 2, 2022, and entitled "MUD FLAPS, MUD FLAP KITS, AND METHODS OF MAKING AND USING THE SAME," the entire contents of which is incorporated herein by reference.

FIELD OF THE INVENTION

This invention relates to mud flaps, and methods of making and using mud flaps.

BACKGROUND

There is a need in the art for new mud flaps that provide one or more functional and/or aesthetic advantages over known mud flaps.

SUMMARY OF THE INVENTION

The present invention is directed to mud flaps. In some embodiments of the present invention, the mud flap of the present invention comprises: (1) a mud flap body having (i) an upper mud flap body edge, (ii) a lower mud flap body edge, (iii) an outer side edge extending between the upper edge and the lower edge, (iv) an inner side edge extending between the upper edge and the lower edge opposite the outer side edge, and (v) a mud flap body front surface bound by the upper mud flap body edge, the lower mud flap body edge, the outer side edge, and the inner side edge, and (2) one or more mud flap components comprising: horse hair, one or more leather fringe components, one or more synthetic leather fringe components, one or more fabric pieces, one or more film pieces, one or more metal foil pieces, one or more laminates comprising two or more fabric pieces, film pieces, metal foil pieces, or any combination thereof, wherein at least one of the one or more mud flap components (a) is attached to or part of the mud flap body, and (b) extends beyond the outer side edge, the inner side edge, the lower mud flap body edge, or any combination thereof.

In some embodiments of the present invention, the mud flap of the present invention comprises: (1) a mud flap body having (i) an upper mud flap body edge, (ii) a lower mud flap body edge, (iii) an outer side edge extending between the upper edge and the lower edge, (iv) an inner side edge extending between the upper edge and the lower edge opposite the outer side edge, and (v) a mud flap body front surface bound by the upper mud flap body edge, the lower mud flap body edge, the outer side edge, and the inner side edge, and (2) horse hair, wherein the horse hair (a) is attached to or part of the mud flap body, and (b) extends beyond the outer side edge, the inner side edge, the lower mud flap body edge, or any combination thereof.

In some embodiments of the present invention, the mud flap of the present invention comprises: (1) a mud flap body having (i) an upper mud flap body edge, (ii) a lower mud flap body edge, (iii) an outer side edge extending between the upper edge and the lower edge, (iv) an inner side edge extending between the upper edge and the lower edge opposite the outer side edge, and (v) a mud flap body front surface bound by the upper mud flap body edge, the lower mud flap body edge, the outer side edge, and the inner side edge, and (2) one or more mud flap components comprising: horse hair, one or more leather fringe components, one or more synthetic leather fringe components, or any combination thereof, wherein the one or more mud flap components (a) is attached to or part of the mud flap body, and (b) extends beyond the outer side edge, the inner side edge, the lower mud flap body edge, or any combination thereof.

The present invention is also directed to mud flap kits used to form the med flaps of the present invention. In some embodiments, the mud flap kits of the present invention comprise one or more mud flap components comprising: horse hair, one or more leather fringe components, one or more synthetic leather fringe components, one or more fabric pieces, one or more film pieces, one or more metal foil pieces, one or more laminates comprising two or more fabric pieces, film pieces, metal foil pieces, or any combination thereof, wherein at least one of the one or more mud flap components (a) is attachable to or a mud flap body, and (b) when attached, extends beyond the outer side edge, the inner side edge, the lower mud flap body edge, or any combination thereof, of the mud flap body.

The present invention is further directed to mud flap accessories that are attachable to a mud flap, and can be formed using the herein-disclosed mud flap kits. In some embodiments, the mud flap accessory of the present invention comprise a mud flap accessory comprising a combination of one or more mud flap components, each of the one or more mud flap components independently comprising: one or more leather fringe components, one or more synthetic leather fringe components, one or more fabric pieces, uni-directional fibers, a heat-treated fibrous web, one or more film pieces, one or more metal foil pieces, one or more laminates comprising two or more of fabric pieces, film pieces, metal foil pieces, or any combination thereof, wherein the combination of the one or more mud flap components (a) is attachable to a mud flap body of the mud flap, and (b) when attached, extends beyond an outer side edge of the mud flap body, an inner side edge of the mud flap body, a lower mud flap body edge of the mud flap body, or any combination thereof.

The present invention is even further directed to methods of making mud flaps. In some embodiments, the method of making a mud flap comprises: attaching one or more mud flap components to a mud flap body, the one or more mud flap components comprising: horse hair, one or more leather fringe components, one or more synthetic leather fringe components, one or more fabric pieces, one or more film pieces, one or more metal foil pieces, one or more laminates comprising two or more fabric pieces, film pieces, metal foil pieces, or any combination thereof, wherein at least one of the one or more mud flap components, when attached to the mud flap body, extends beyond the outer side edge, the inner side edge, the lower mud flap body edge, or any combination thereof, of the mud flap body.

The present invention is further directed to methods of using mud flaps, mud flap forming kits, and mud flap accessories. In some embodiments of the present invention, the method of using a mud flap, a mud flap forming kit, and/or a mud flap accessory comprises positioning any one of the herein-described mud flaps and/or mud flap accessories (i.e., on a mud flap) on a vehicle so as to extend vertically behind a wheel of the vehicle. In some embodiments, the vehicle comprises a truck, a car, a bus, a recreational vehicle (RV), a sport utility vehicle (SUV), or any other passenger vehicle having an enclosed passenger compartment and three or more wheels.

These and other features and advantages of the present invention will become apparent after a review of the following detailed description of the disclosed embodiments and the appended claims.

BRIEF DESCRIPTION OF THE DRAWINGS

The present invention is further described with reference to the appended figures, wherein.

Figure 1:
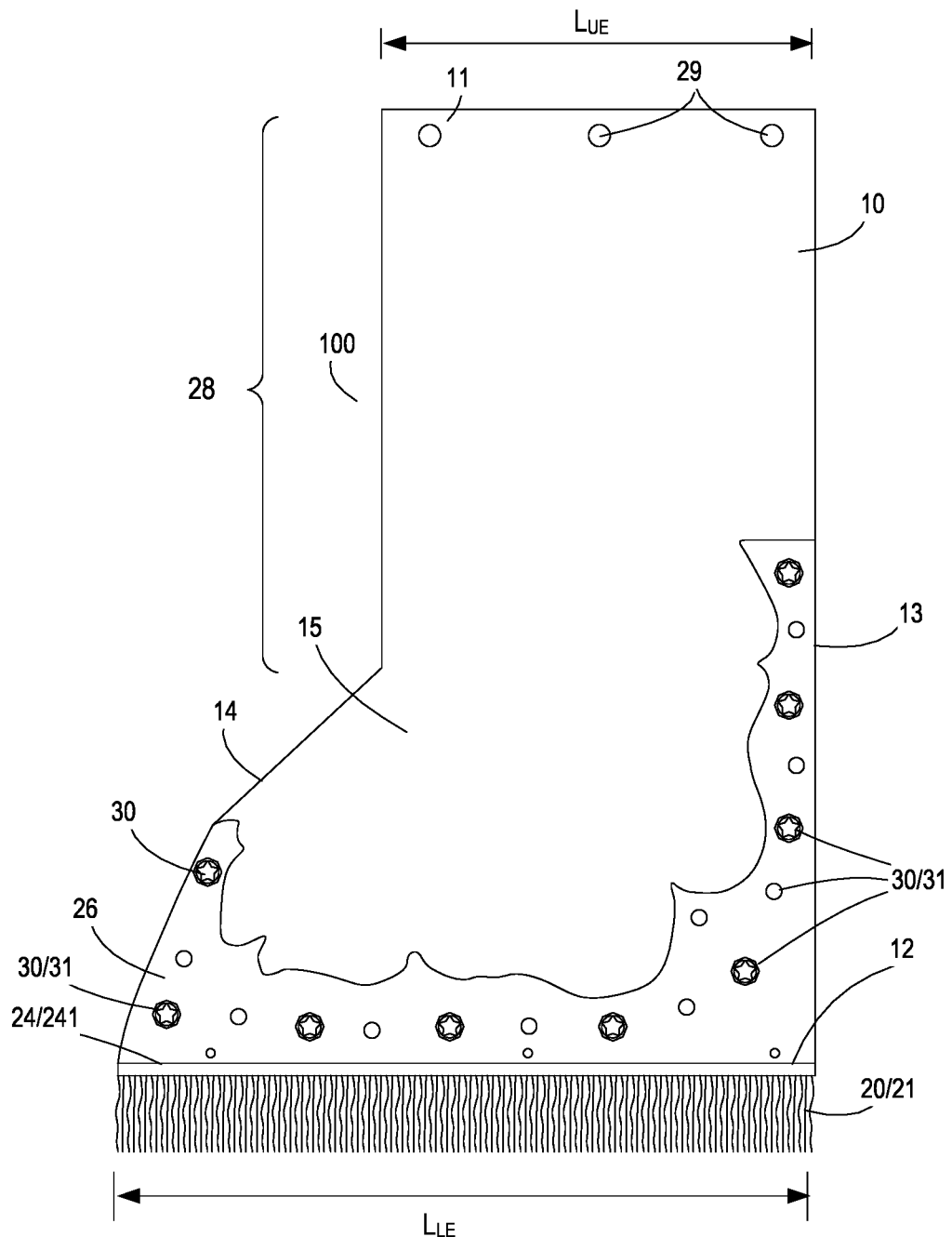
FIG. 1 is a perspective view of an exemplary mud flap of the present invention.

The features of the present mud flaps and methods are set forth in part in the following preferred embodiments. This overview is intended to provide nonlimiting descriptions of the present subject matter and is not intended to provide an exclusive or exhaustive explanation. The preferred embodiments below provide further information about the mud flaps and methods of the present invention as described herein.

DETAILED DESCRIPTION OF THE INVENTION

The present invention relates to mud flaps. The mud flaps can be used on any vehicle to provide protection against objects bouncing upward and striking the vehicle. The mud flaps also provide (or enable a use to provide) a customized look for their mud flaps. Exemplary mud flaps and components thereof are shown, for example, in FIGS. 1-10B.

The mud flaps of the present invention, methods of making mud flaps of the present invention, and methods of using the mud flaps of the present invention are further described in the following additional embodiments.

ADDITIONAL EMBODIMENTS

Mud Flaps

1. A mud flap 100 comprising: a mud flap body 10 having (i) an upper mud flap body edge 11, (ii) a lower mud flap body edge 12, (iii) an outer side edge 13 extending between said upper mud flap body edge 11 and said lower mud flap body edge 12, (iv) an inner side edge 14 extending between said upper mud flap body edge 11 and said lower mud flap body edge 12 opposite said outer side edge 13, and (v) a mud flap body front surface 15 bound by said upper mud flap body edge 11, said lower mud flap body edge 12, said outer side edge 13, and said inner side edge 14, and one or more mud flap components 20 comprising: horse hair 21, one or more leather fringe components 22, one or more synthetic leather fringe components 23, one or more fabric pieces 24, one or more film pieces 25, one or more metal foil pieces 26, one or more laminates 27 comprising two or more fabric pieces 24, film pieces 25, metal foil pieces 26, or any combination thereof, wherein at least one of said one or more mud flap components 20 (a) is attached to or part of said mud flap body 10, and (b) extends beyond said outer side edge 13, said inner side edge 14, said lower mud flap body edge 12, or any combination thereof. It should be noted that the phrase "metal foil piece" is used to describe a metal piece that is thin enough to be bent with little force (e.g., aluminum foil), as well as, thicker metal pieces that have more rigidity, and are more difficult to bend (e.g., an aluminum metal piece having a thickness of up to about 3.0 to about 6.0 millimeters (mm))

2. The mud flap 100 of embodiment 1, wherein at least one of said one or more mud flap components 20 extends beyond said outer side edge 13, said inner side edge 14, or any combination thereof.

3. The mud flap 100 of embodiment 1 or 2, wherein at least one of said one or more mud flap components 20 extends beyond said outer side edge 13.

4. The mud flap 100 of any one of embodiments 1 to 3, wherein at least one of said one or more mud flap components 20 extends beyond said inner side edge 14.

5. The mud flap 100 of any one of embodiments 1 to 4, wherein at least one of said one or more mud flap components 20 extends beyond said lower mud flap body edge 12.

6. The mud flap 100 of any one of embodiments 1 to 5, wherein said upper mud flap body edge 11, and said lower mud flap body edge 12 are substantially parallel with one another.

7. The mud flap 100 of any one of embodiments 1 to 6, wherein said upper mud flap body edge 11 has an upper mud flap body edge length $L_{UE}$, and said lower mud flap body edge 12 has a lower mud flap body edge length $L_{LE}$, and said lower mud flap body edge length $L_{LE}$ is substantially equal to or greater than said upper mud flap body edge length $L_{UE}$. See, for example, FIG. 1.

8. The mud flap 100 of embodiment 7, wherein said lower mud flap body edge length $L_{LE}$ is greater than said upper mud flap body edge length $L_{UE}$.

9. The mud flap 100 of any one of embodiments 1 to 8, wherein portions 28 of said outer side edge 13 and said inner side edge 14 are substantially parallel with one another.

10. The mud flap 100 of any one of embodiments 1 to 9, wherein upper portions 28 of said outer side edge 13 and said inner side edge 14 are substantially parallel with one another.

11. The mud flap 100 of any one of embodiments 1 to 10, wherein said outer side edge 13 is substantially parallel to said inner side edge 14.

12. The mud flap 100 of any one of embodiments 1 to 11, wherein said one or more mud flap components 20 comprises horse hair 21.

13. The mud flap 100 of any one of embodiments 1 to 12, wherein said one or more mud flap components 20 comprises one or more leather fringe components 22.

Figure 2:
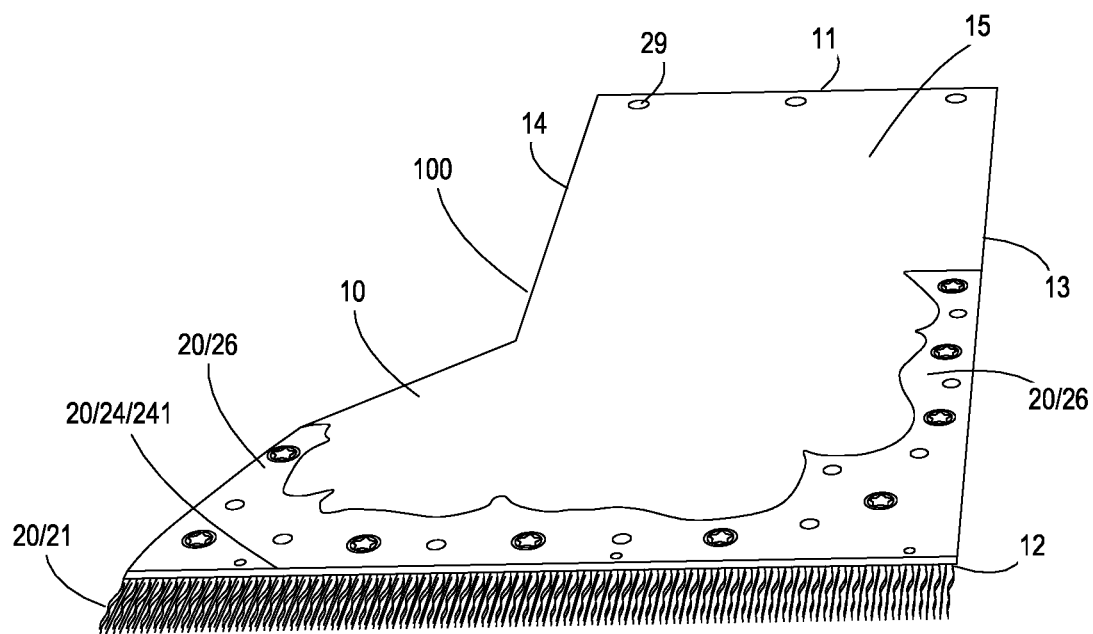
FIG. 2 is a perspective view of another exemplary mud flap of the present invention.
Figure 3:
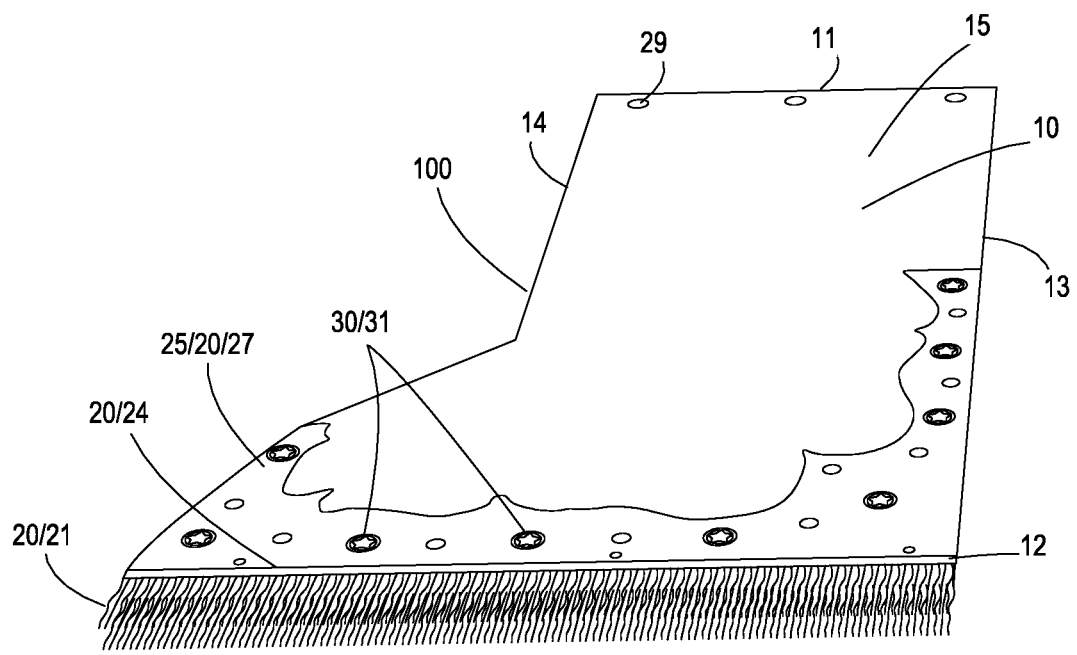
FIG. 3 is a perspective view of another exemplary mud flap of the present invention.
Figure 4:
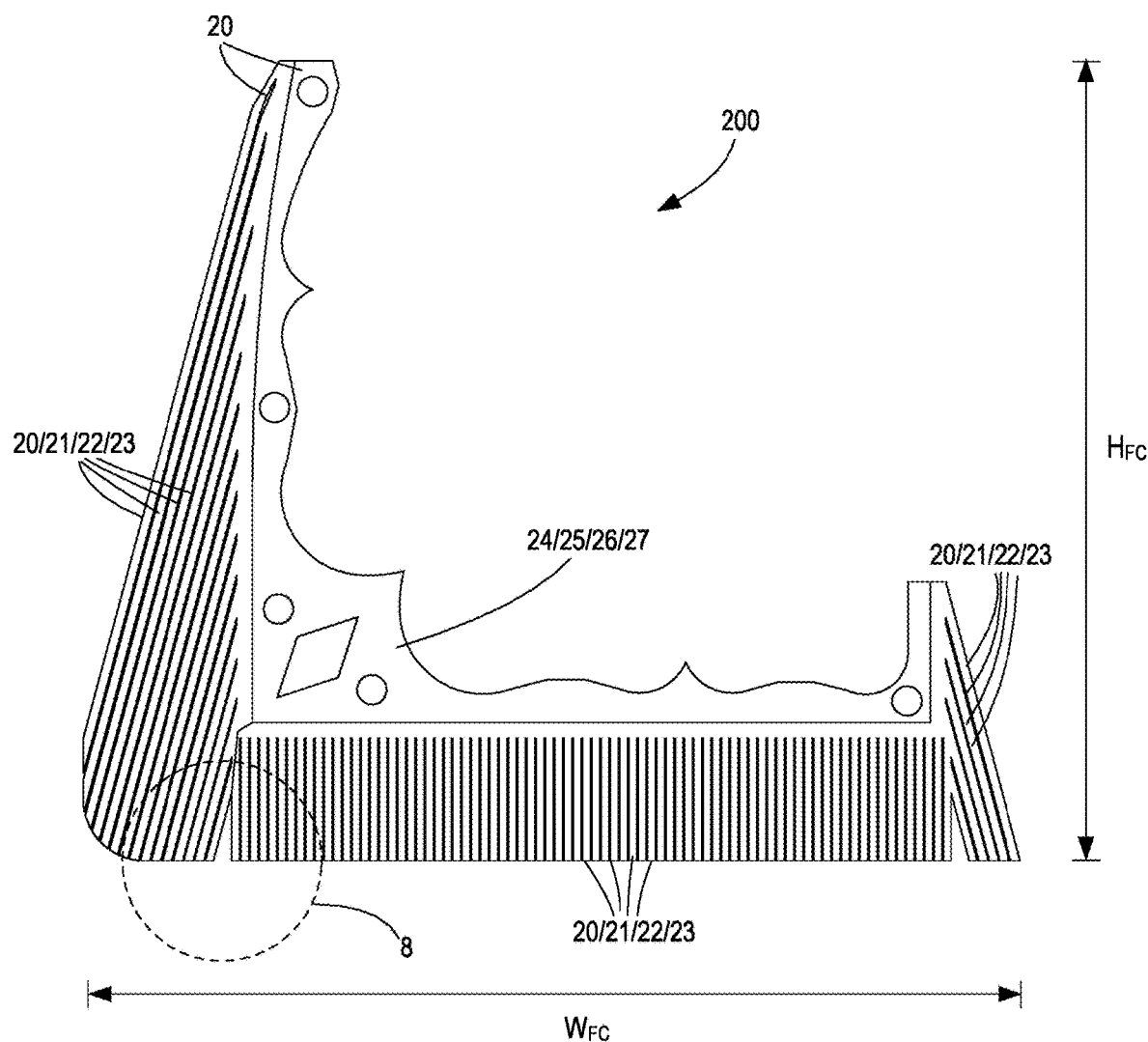
FIG. 4 is a front view of an exemplary mud flap accessory of the present invention.
Figure 5:
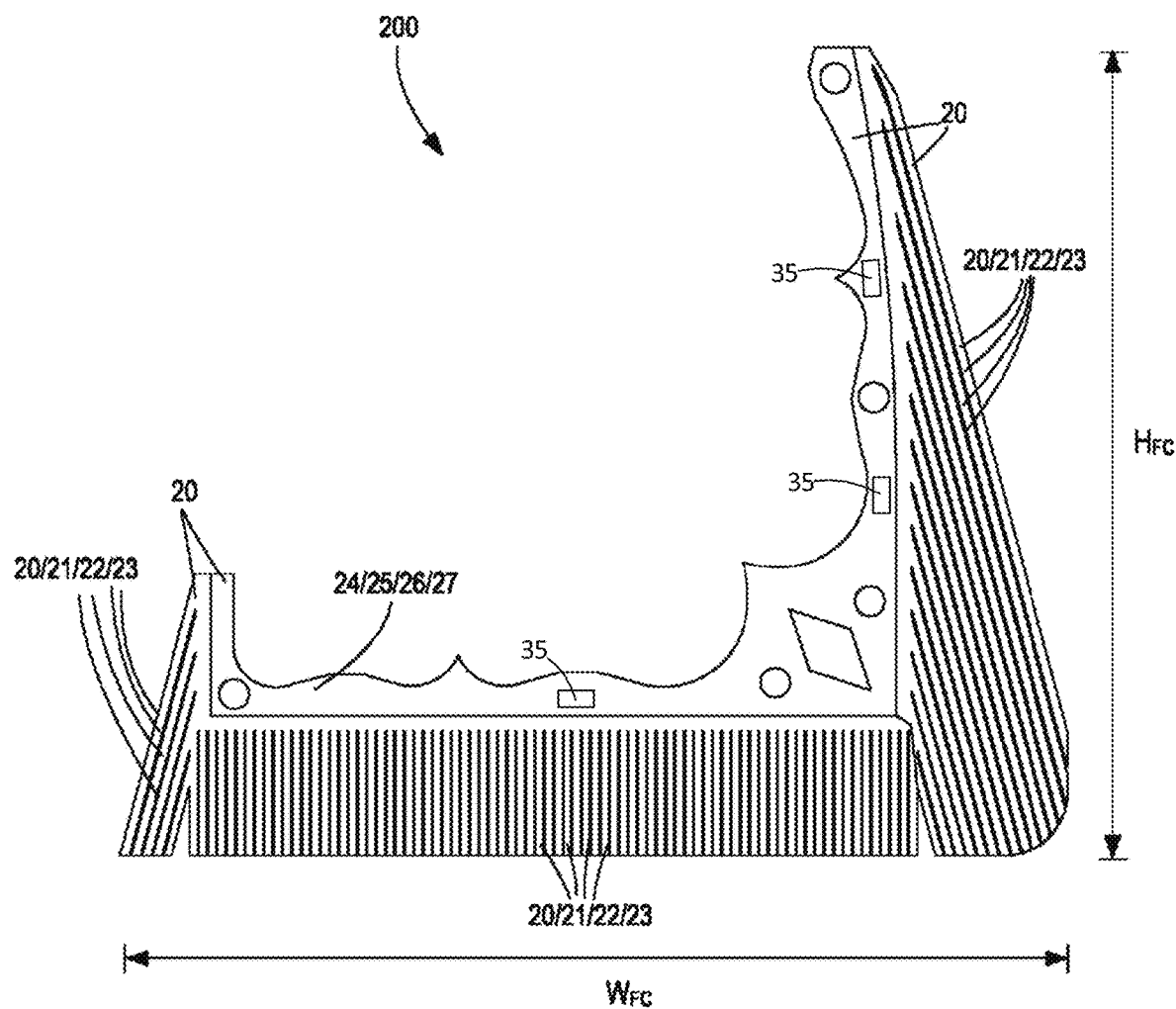
FIG. 5 is a rear view of the mud flap accessory shown in FIG. 4.
Figure 6:
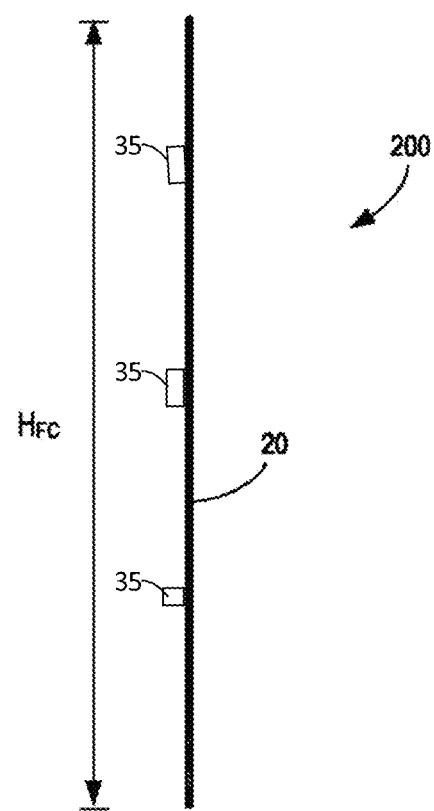
FIG. 6 is a side view of the mud flap accessory shown in FIG. 4.
Figure 7:
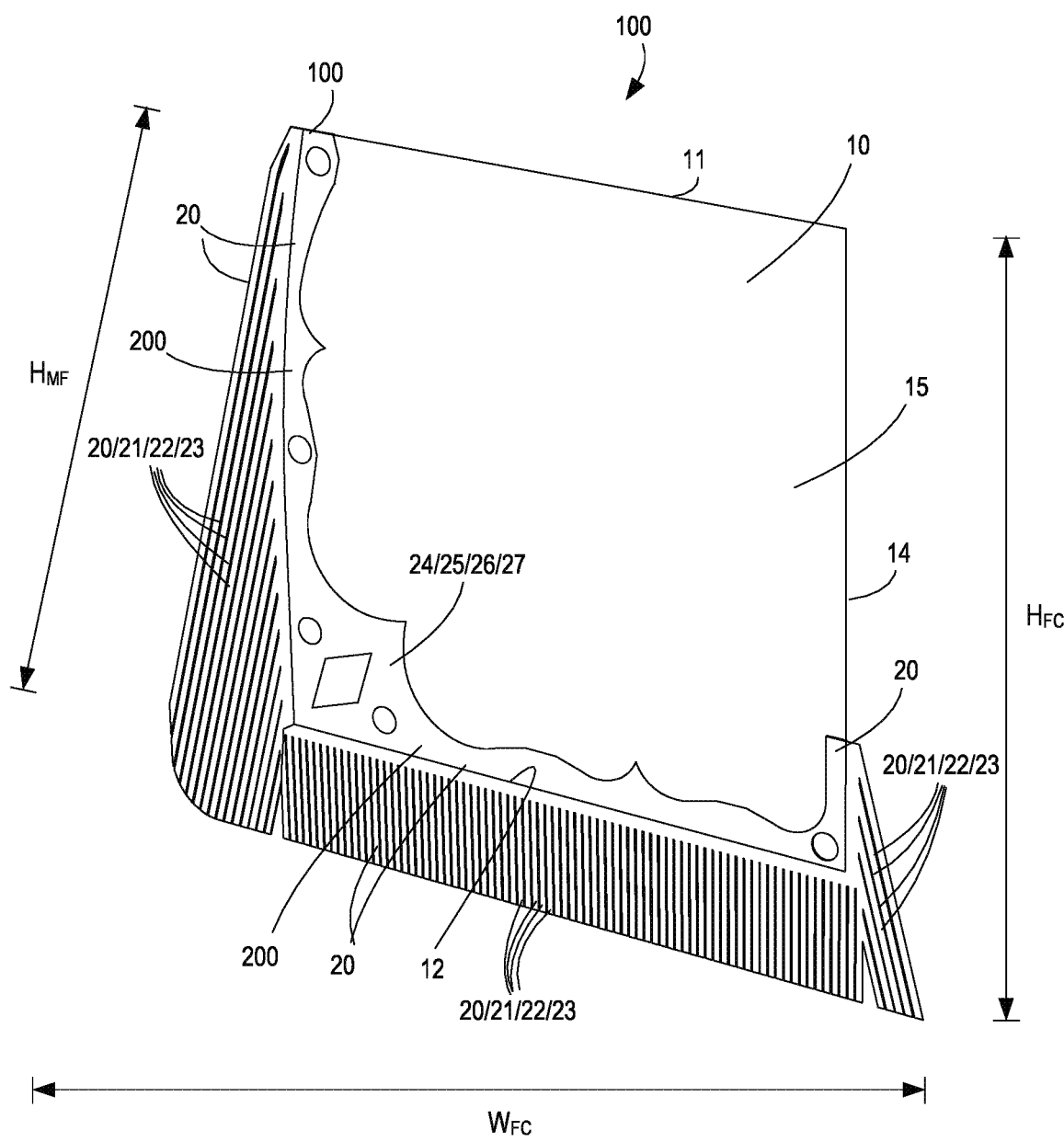
FIG. 7 is a perspective view of the mud flap accessory shown in FIG. 4 attached to a mud flap.
Figure 8:
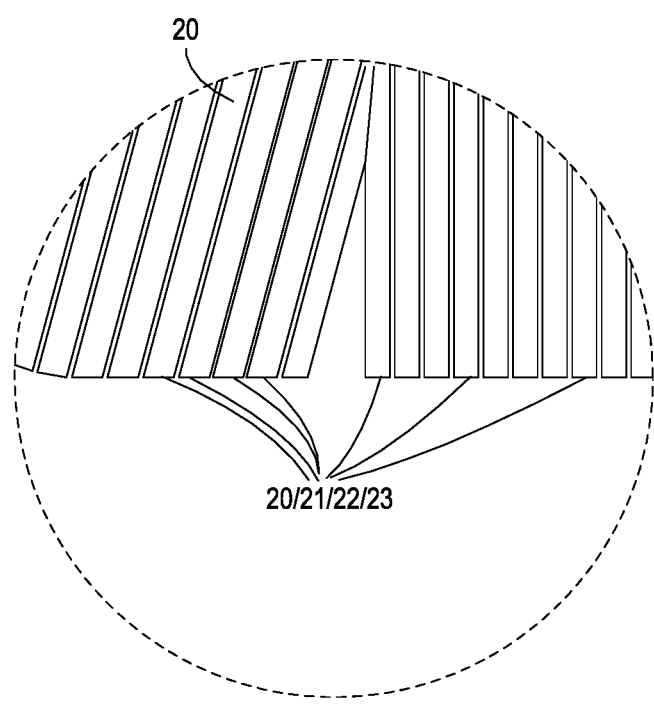
FIG. 8 is an exploded view of the circled area shown in FIG. 4.
Figure 9:
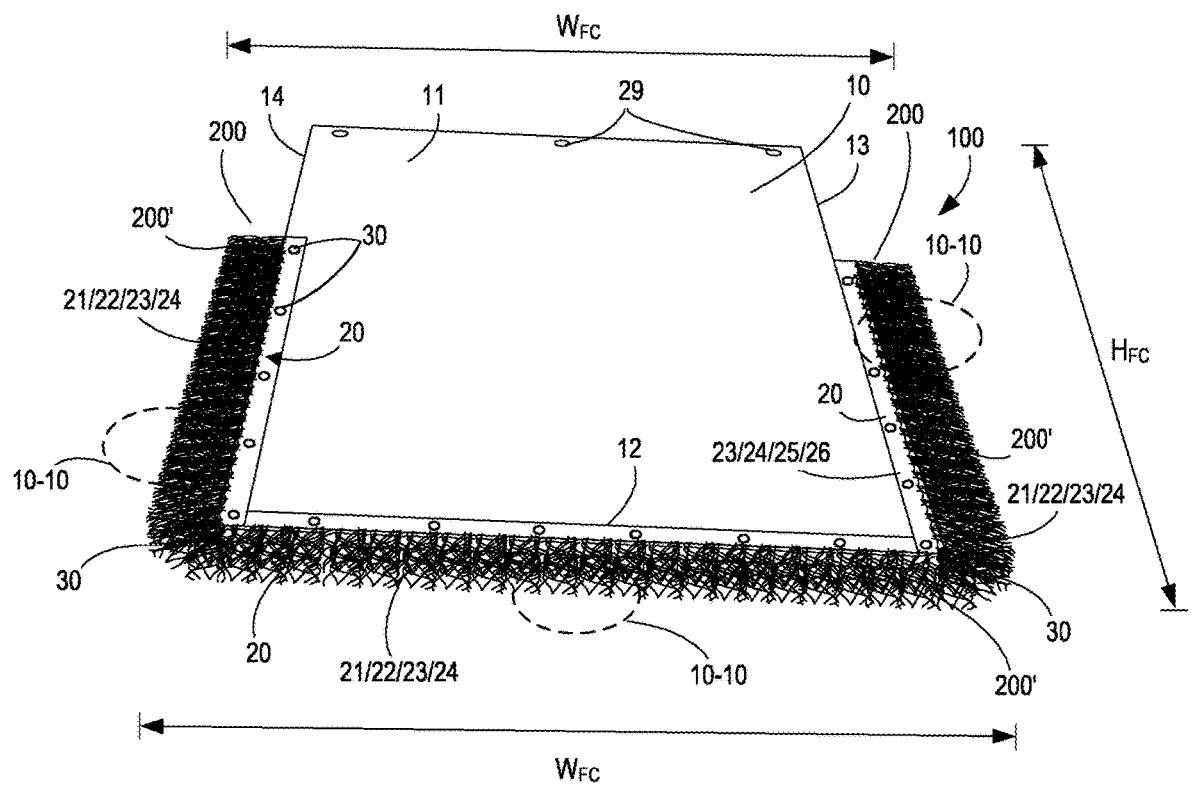
FIG. 9 is a perspective view of another exemplary mud flap of the present invention.
Figure 10A:
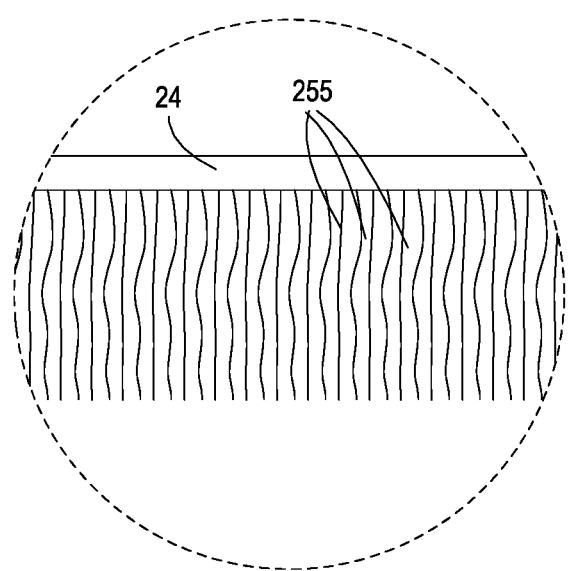
FIGS. 10A-10B provide alternative explosive views of the three circled areas 10-10 shown in FIG. 9.
Figure 10B:
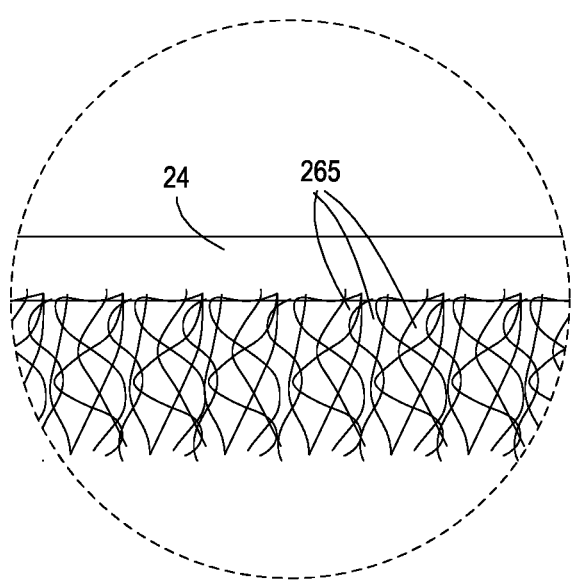

14. The mud flap 100 of any one of embodiments 1 to 13, wherein said one or more mud flap components 20 comprises one or more synthetic leather fringe components 23.
15. The mud flap 100 of any one of embodiments 1 to 14, wherein said one or more mud flap components 20 comprises one or more fabric pieces 24. It should be understood that any type of fabric could be used including, but not limited to, woven fabrics, nonwoven fabrics, knit fabrics, fabrics comprising one or more uni-directional fiber layers, or any combination thereof. See, for example, fabric piece 24 in the form of a fabric ribbon 241 used to support horse hair 21 thereon as shown in FIG. 2. See also, for example, fabric piece 24 in the form of uni-directional fibers 255 shown in FIG. 10A, and fabric piece 24 in the form of a heat-treated fibrous web 265 shown in FIG. 10B. As used herein, the phrase "heat-treated fibrous web" is used to describe a fibrous web that has been subjected to heat so as to shrink and/or melt and/or bond two or more fibers to one another resulting in a wool-like, void-containing fibrous mass 265. For example, exemplary heat-treated fibrous web 265 shown in FIG. 10B is the result of heat-treating the of uni-directional fibers 255 shown in FIG. 10A. As shown in FIGS. 10A-10B, heat treatment of the uni-directional fibers 255 shown in FIG. 10A causes the uni-directional fibers 255 to shrink slightly, and melt so as to bond to one another, forming a wool-like, void-containing fibrous mass 265 with enhanced rigidity when compared to the uni-directional fibers 255.
16. The mud flap 100 of any one of embodiments 1 to 15, wherein said one or more mud flap components 20 comprises one or more film pieces 25. It should be understood that any type of film material could be used including, but not limited to, polymeric materials, cellulosic materials, or any combination thereof. See, for example, film piece 25 forming an outer layer of a laminate 27 shown in FIG. 3.
17. The mud flap 100 of any one of embodiments 1 to 16, wherein said one or more mud flap components 20 comprises one or more metal foil pieces 26. It should be understood that any type of metal foil piece 26 could be used including, but not limited to, an aluminum foil piece, a chrome foil piece, polymeric materials coated with a layer of metallic material, cellulosic materials coated with a layer of metallic material, or any combination thereof.
18. The mud flap 100 of any one of embodiments 1 to 17, wherein said one or more mud flap components 20 comprises one or more laminates 27 comprising two or more fabric pieces 24, film pieces 25, metal foil pieces 26, or any combination thereof.
19. The mud flap 100 of embodiment 18, wherein said one or more laminates 27 comprises at least one metal foil piece 26.
20. The mud flap 100 of embodiment 18 or 19, wherein said one or more laminates 27 comprises at least one metal foil piece 26 and at least one film piece 25.
21. The mud flap 100 of any one of embodiments 1 to 20, wherein said one or more mud flap components 20 comprises one or more metal foil pieces 26 attached to said mud flap body front surface 15, a portion of said one or more metal foil pieces 26 extending along said lower mud flap body edge 12, said outer side edge 13, said inner side edge 14, or any combination thereof.
22. The mud flap 100 of embodiment 21, wherein said portion of said one or more metal foil pieces 26 extends along said outer side edge 13.
23. The mud flap 100 of embodiment 21 or 22, wherein said portion of said one or more metal foil pieces 26 extends along said lower side edge 12.
24. The mud flap 100 of any one of embodiments 21 to 23, wherein said portion of said metal foil pieces 26 extends along said inner side edge 14.
25. The mud flap 100 of any one of embodiments 21 to 24, further comprising uni-directional fibers 255, heat-treated fibrous web 265, or any combination thereof extending along said lower side edge 12.
26. The mud flap 100 of any one of embodiments 21 to 25, further comprising heat-treated fibrous web 265 extending along said lower side edge 12.
27. The mud flap 100 of any one of embodiments 21 to 26, further comprising heat-treated fibrous web 265 extending along said outer side edge 13.
28. The mud flap 100 of any one of embodiments 21 to 27, further comprising heat-treated fibrous web 265 extending along said outer side edge 13.
29. The mud flap 100 of any one of embodiments 21 to 28, further comprising one or more leather fringe components 22, one or more synthetic leather fringe components 23 extending along said outer side edge 13.
30. The mud flap 100 of any one of embodiments 1 to 29, further comprising one or more additional components (not shown), said one or more additional components comprising: one or more metal ornaments, one or more plastic ornaments, one or more metal stars, one or more plastic stars, one or more metal beads, one or more plastic beads, one or more western-style metal components, one or more western-style plastic components, one or more cowboy-themed metal components, one or more cowboy-themed plastic components, one or more lights, one or more electrical wires, one or more electrical connectors, one or more light reflectors, or any combination thereof.
31. The mud flap 100 of any one of embodiments 1 to 30, further comprising one or more attachment components 30 suitable for connecting said one or more mud flap components 20 to said mud flap body 15.
32. The mud flap 100 of embodiment 31, further wherein said one or more attachment components 30 are selected from metal rivets 31, adhesive, double-sided adhesive tape 35, screws, stitching, or any combination thereof.
33. The mud flap 100 of embodiment 31 or 32, further wherein said one or more attachment components 30 comprise metal rivets 31.
34. The mud flap 100 of any one of embodiments 1 to 33, wherein said mud flap body 15 comprises a polymeric material, a rubber material, or any combination thereof.
35. The mud flap 100 of embodiment 34, wherein said mud flap body 15 comprises a polymeric material.
36. The mud flap 100 of embodiment 34, wherein said mud flap body 15 comprises a rubber material.
37. The mud flap 100 of any one of embodiments 1 to 36, further comprising two or more holes 29 within said mud flap body 15 along said upper side edge 11, said two or more holes 29 enabling attachment of said mud flap body 15 to a vehicle (not shown).
38. The mud flap 100 of any one of embodiments 1 to 37 attached to a vehicle (not shown), wherein the vehicle comprises a truck, a car, a bus, a recreational vehicle (RV), a sport utility vehicle (SUV), or any other passenger vehicle having an enclosed passenger compartment and three or more wheels.

39. The mud flap 100 of embodiment 38, wherein the vehicle comprises a school bus.

40. The mud flap 100 of embodiment 38, wherein the vehicle comprises a truck having from 4 to 18 wheels.

41. The mud flap 100 of any one of embodiments 38. 39, and 40, wherein the vehicle comprises a truck having 18 wheels.

42. A mud flap 100 comprising: a mud flap body 10 having (i) an upper mud flap body edge 11, (ii) a lower mud flap body edge 12, (iii) an outer side edge 13 extending between said upper mud flap body edge 11 and said lower mud flap body edge 12, (iv) an inner side edge 14 extending between said upper mud flap body edge 11 and said lower mud flap body edge 12 opposite said outer side edge 13, and (v) a mud flap body front surface 15 bound by said upper mud flap body edge 11, said lower mud flap body edge 12, said outer side edge 13, and said inner side edge 14, and a heat-treated fibrous web 265, wherein said heat-treated fibrous web 265 (a) is attached to or part of said mud flap body 10, and (b) extends beyond said outer side edge 13, said inner side edge 14, said lower mud flap body edge 12, or any combination thereof.

43. The mud flap 100 of embodiment 42, wherein said mud flap 100 comprises one or more of the features described in any one of embodiments 1 to 41.

44. The mud flap 100 of embodiment 42 or 43, wherein said heat-treated fibrous web 265 extends along said outer side edge 13.

45. The mud flap 100 of any one of embodiments 42 to 44, wherein said heat-treated fibrous web 265 extends along said lower side edge 12.

46. The mud flap 100 of any one of embodiments 42 to 45, wherein said heat-treated fibrous web 265 extends along said inner side edge 14.

47. A mud flap 100 comprising: a mud flap body 10 having (i) an upper mud flap body edge 11, (ii) a lower mud flap body edge 12, (iii) an outer side edge 13 extending between said upper mud flap body edge 11 and said lower mud flap body edge 12, (iv) an inner side edge 14 extending between said upper mud flap body edge 11 and said lower mud flap body edge 12 opposite said outer side edge 13, and (v) a mud flap body front surface 15 bound by said upper mud flap body edge 11, said lower mud flap body edge 12, said outer side edge 13, and said inner side edge 14, and one or more mud flap components 20 comprising: horse hair 21, one or more leather fringe components 22, one or more synthetic leather fringe components 23, uni-directional fibers 255, a heat-treated fibrous web 265, or any combination thereof, wherein said one or more mud flap components 20 (a) is attached to or part of said mud flap body 10, and (b) extends beyond said outer side edge 13, said inner side edge 14, said lower mud flap body edge 12, or any combination thereof.

48. The mud flap 100 of embodiment 47, wherein said mud flap 100 comprises one or more of the features described in any one of embodiments 1 to 41.

49. The mud flap 100 of embodiment 47 or 48, wherein said one or more mud flap components 20 extends along said outer side edge 13.

50. The mud flap 100 of any one of embodiments 47 to 49, wherein said one or more mud flap components 20 extends along said lower side edge 12.

51. The mud flap 100 of any one of embodiments 47 to 50, wherein said one or more mud flap components 20 extends along said inner side edge 14.

52. The mud flap 100 of any one of embodiments 47 to 51, wherein said one or more mud flap components 20 comprises uni-directional fibers 255, a heat-treated fibrous web 265, or both.

53. The mud flap 100 of any one of embodiments 47 to 52, wherein said one or more mud flap components 20 comprises a heat-treated fibrous web 265.

Kits Comprising Mud Flap Components

54. A mud flap forming kit 1000 for forming the mud flap 100 of any one of embodiments 1 to 53, said mud flap forming kit 1000 comprising: one or more mud flap components 20 comprising: horse hair 21, one or more leather fringe components 22, one or more synthetic leather fringe components 23, one or more fabric pieces 24, one or more film pieces 25, one or more metal foil pieces 26, one or more laminates 27 comprising two or more fabric pieces 24, film pieces 25, metal foil pieces 26, or any combination thereof, wherein at least one of the one or more mud flap components 20 (a) is attachable to a mud flap body 10 of the mud flap 100, and (b) when attached, extends beyond an outer side edge 13 of the mud flap body 10, an inner side edge 14 of the mud flap body 10, a lower mud flap body edge 12 of the mud flap body 10, or any combination thereof.

55. The mud flap forming kit 1000 of embodiment 54, wherein said mud flap forming kit 1000 comprises one or more fabric pieces 24 comprising uni-directional fibers 255, a heat-treated fibrous web 265, or any combination thereof.

56. The mud flap forming kit 1000 of embodiment 54 or 55, wherein said mud flap forming kit 1000 comprises one or more fabric pieces 24 comprising a heat-treated fibrous web 265.

57. The mud flap forming kit 1000 of any one of embodiments 54 to 56, wherein said mud flap forming kit 1000 comprises one or more fabric pieces 24, one or more film pieces 25, one or more metal foil pieces 26, one or more laminates 27 comprising two or more fabric pieces 24, film pieces 25, metal foil pieces 26, or any combination thereof.

58. The mud flap forming kit 1000 of any one of embodiments 54 to 57, wherein said mud flap forming kit 1000 comprises any (i) one or (ii) combination of the one or more mud flap components 20 described in any one of embodiments 1 to 53.

59. The mud flap forming kit 1000 of any one of embodiments 54 to 58, wherein at least one of said one or more mud flap components 20, when attached to the mud flap body 10 of the mud flap 100, extends beyond the outer side edge 13 of the mud flap body 10, the inner side edge 14 of the mud flap body 10, or any combination thereof.

60. The mud flap forming kit 1000 of any one of embodiments 54 to 59, wherein at least one of the one or more mud flap components 20, when attached to the mud flap body 10 of the mud flap 100, extends beyond the outer side edge 13 of the mud flap body 10.

61. The mud flap forming kit 1000 of any one of embodiments 54 to 60, wherein at least one of said one or more mud flap components 20, when attached to the mud flap body 10 of the mud flap 100, extends beyond the inner side edge 14 of the mud flap body 10.

62. The mud flap forming kit 1000 of any one of embodiments 54 to 61, wherein at least one of said one or more mud flap components 20, when attached to the mud flap body 10 of the mud flap 100, extends beyond the lower mud flap body edge 12 of the mud flap body 10.
63. The mud flap forming kit 1000 of any one of embodiments 54 to 62, wherein the upper mud flap body edge 11 of the mud flap body 10, and the lower mud flap body edge 12 of the mud flap body 10 are substantially parallel with one another.
64. The mud flap forming kit 1000 of any one of embodiments 54 to 63, wherein the upper mud flap body edge 11 of the mud flap body 10 has an upper mud flap body edge length $L_{UE}$, and the lower mud flap body edge 12 of the mud flap body 10 has a lower mud flap body edge length $L_{LE}$ of the mud flap body 10, and the lower mud flap body edge length $L_{LE}$ is substantially equal to or greater than the upper mud flap body edge length $L_{UE}$. See, for example, FIG. 1.
65. The mud flap forming kit 1000 of embodiment 64, wherein the lower mud flap body edge length $L_{LE}$ of the mud flap body 10 is greater than the upper mud flap body edge length $L_{UE}$ of the mud flap body 10.
66. The mud flap forming kit 1000 of any one of embodiments 54 to 65, wherein portions 28 of the outer side edge 13 of the mud flap body 10 and the inner side edge 14 of the mud flap body 10 are substantially parallel with one another.
67. The mud flap forming kit 1000 of any one of embodiments 54 to 66, wherein upper portions 28 of the outer side edge 13 of the mud flap body 10 and the inner side edge 14 of the mud flap body 10 are substantially parallel with one another.
68. The mud flap forming kit 1000 of any one of embodiments 54 to 67, wherein the outer side edge 13 of the mud flap body 10 is substantially parallel to the inner side edge 14 of the mud flap body 10.
69. The mud flap forming kit 1000 of any one of embodiments 54 to 68, wherein said one or more mud flap components 20 comprises one or more fabric pieces 24 comprising uni-directional fibers 255, a heat-treated fibrous web 265, or any combination thereof.
70. The mud flap forming kit 1000 of any one of embodiments 54 to 69, wherein said one or more mud flap components 20 comprises uni-directional fibers 25.
71. The mud flap forming kit 1000 of any one of embodiments 54 to 70, wherein said one or more mud flap components 20 comprises a heat-treated fibrous web 265.
72. The mud flap forming kit 1000 of any one of embodiments 54 to 71, wherein said one or more mud flap components 20 comprises one or more fabric pieces 24. It should be understood that any type of fabric could be used including, but not limited to, woven fabrics, nonwoven fabrics, knit fabrics, fabrics comprising one or more uni-directional fiber layers, a heat-treated fibrous web 265, or any combination thereof. See, for example, fabric piece 24 in the form of a fabric ribbon 241 used to support horse hair 21 thereon as shown in FIG. 2.
73. The mud flap forming kit 1000 of any one of embodiments 54 to 72, wherein said one or more mud flap components 20 comprises one or more film pieces 25. It should be understood that any type of film material could be used including, but not limited to, polymeric materials, cellulosic materials, or any combination thereof. See, for example, film piece 25 forming an outer layer of a laminate 27 shown in FIG. 3.
74. The mud flap forming kit 1000 of any one of embodiments 54 to 73, wherein said one or more mud flap components 20 comprises one or more metal foil pieces 26. It should be understood that any type of metal foil piece 26 could be used including, but not limited to, an aluminum foil piece, a chrome foil piece, polymeric materials coated with a layer of metallic material, cellulosic materials coated with a layer of metallic material, or any combination thereof.
75. The mud flap forming kit 1000 of any one of embodiments 54 to 74, wherein said one or more mud flap components 20 comprises one or more laminates 27 comprising two or more of: one or more fabric pieces 24, one or more film pieces 25, one or more metal foil pieces 26, or any combination thereof.
76. The mud flap forming kit 1000 of any one of embodiment 75, wherein said one or more laminates 27 comprises at least one metal foil piece 26.
77. The mud flap forming kit 1000 of any one of embodiment 75 or 76, wherein said one or more laminates 27 comprises at least one metal foil piece 26 and at least one film piece 25.
78. The mud flap forming kit 1000 of any one of embodiments 54 to 77, wherein said one or more mud flap components 20 comprises one or more metal foil pieces 26 attached to a mud flap body front surface 15 of the mud flap body 10, a portion of said one or more metal foil pieces 26 extending along the lower mud flap body edge 12 of the mud flap body 10, the outer side edge 13 of the mud flap body 10, the inner side edge 14 of the mud flap body 10, or any combination thereof.
79. The mud flap forming kit 1000 of any one of embodiment 78, wherein said portion of said one or more metal foil pieces 26 extends along the outer side edge 13 of the mud flap body 10.
80. The mud flap forming kit 1000 of any one of embodiment 78 or 79, wherein said portion of said one or more metal foil pieces 26 extends along the lower side edge 12 of the mud flap body 10.
81. The mud flap forming kit 1000 of any one of embodiments 78 to 80, wherein said portion of said metal foil pieces 26 extends along the inner side edge 14 of the mud flap body 10.
82. The mud flap forming kit 1000 of any one of embodiments 78 to 81, wherein the one or more mud flap components 20 comprise one or more fabric pieces 24 comprising uni-directional fibers 255, a heat-treated fibrous web 265, or any combination thereof, extending along the lower side edge 12 of the mud flap body 10.
83. The mud flap forming kit 1000 of any one of embodiments 78 to 82, wherein the one or more mud flap components 20 comprise a heat-treated fibrous web 265 extending along the lower side edge 12 of the mud flap body 10.
84. The mud flap forming kit 1000 of any one of embodiments 78 to 83, wherein the one or more mud flap components 20 comprise a heat-treated fibrous web 265 extending along the outer side edge 13 of the mud flap body 10.
85. The mud flap forming kit 1000 of any one of embodiments 78 to 84, wherein the one or more mud flap components 20 comprise a heat-treated fibrous web 265 extending along the outer side edge 13 of the mud flap body 10.
86. The mud flap forming kit 1000 of any one of embodiments 78 to 87, wherein the one or more mud flap components 20 comprise one or more leather fringe components 22, one or more synthetic leather fringe components 23, or any combination thereof, extending along the outer side edge 13 of the mud flap body 10.
87. The mud flap forming kit 1000 of any one of embodiments 54 to 86, wherein the one or more mud flap components 20 further comprise one or more additional components (not shown), said one or more additional components comprising: one or more metal ornaments, one or more plastic ornaments, one or more metal stars, one or more plastic stars, one or more metal beads, one or more plastic beads, one or more western-style metal components, one or more western-style plastic components, one or more cowboy-themed metal components, one or more cowboy-themed plastic components, one or more lights, one or more electrical wires, one or more electrical connectors, one or more light reflectors, or any combination thereof.
88. The mud flap forming kit 1000 of any one of embodiments 54 to 87, wherein the one or more mud flap components 20 further comprise one or more attachment components 30 suitable for connecting said one or more mud flap components 20 to the mud flap body 10.
89. The mud flap forming kit 1000 of embodiment 88, wherein said one or more attachment components 30 are selected from metal rivets 31, adhesive, double-sided adhesive tape 35, screws, stitching, or any combination thereof.
90. The mud flap forming kit 1000 of embodiment 88 or 89, wherein said one or more attachment components 30 comprise metal rivets 31.
91. The mud flap forming kit 1000 of any one of embodiments 54 to 90, wherein said more mud flap components 20 are attached to a mud flap body 10 comprising a polymeric material 15, a rubber material 15, or any combination thereof.
92. The mud flap forming kit 1000 of embodiment 91, wherein said more mud flap components 20 are attached to a mud flap body 10 comprising a polymeric material 15.
93. The mud flap forming kit 1000 of embodiment 91, wherein said more mud flap components 20 are attached to a mud flap body 10 comprising a rubber material 15.
94. The mud flap forming kit 1000 of any one of embodiments 54 to 93, wherein said more mud flap components 20 are attached to a mud flap body 10 comprising two or more holes 29 within the mud flap body 10 along the upper side edge 11, the two or more holes 29 enabling attachment of the mud flap body 10 to a vehicle (not shown).
95. The mud flap forming kit 1000 of any one of embodiments 54 to 94 wherein said more mud flap components 20 are attached to a mud flap body 10 attached to a vehicle (not shown), wherein the vehicle comprises a truck, a car, a bus, a recreational vehicle (RV), a sport utility vehicle (SUV), or any other passenger vehicle having an enclosed passenger compartment and three or more wheels.
96. The mud flap forming kit 1000 of embodiment 95, wherein the vehicle comprises a school bus.
97. The mud flap forming kit 1000 of embodiment 95, wherein the vehicle comprises a truck having from 4 to 18 wheels.
98. The mud flap forming kit 1000 of any one of embodiments 95 to 97, wherein the vehicle comprises a truck having 18 wheels.
99. The mud flap forming kit 1000 of any one of embodiments 54 to 98, wherein said mud flap forming kit 1000 further comprises one or more additional components (not shown) comprising: one or more metal ornaments, one or more plastic ornaments, one or more metal stars, one or more plastic stars, one or more metal beads, one or more plastic beads, one or more western-style metal components, one or more western-style plastic components, one or more cowboy-themed metal components, one or more cowboy-themed plastic components, one or more lights, one or more electrical wires, one or more electrical connectors, one or more light reflectors, or any combination thereof. Any of the one or more additional components may be connected/attached to an outer surface, such as mud flap body front surface 15, or configured to extend on or within mud flap body 10, or designed to be attached to one or more of the one of more mud flap components 20 of the mud flap forming kit 1000.
100. The mud flap forming kit 1000 of any one of embodiments 54 to 99, wherein said mud flap forming kit 1000 further comprises: one or more mud flap bodies 10.
101. The mud flap forming kit 1000 of embodiment 100, wherein said mud flap body 10 has one or more features (e.g., size, shape, configuration of side edges 13/14, holes 29, etc.) discussed in any one of embodiments 1 to 53.
102. The mud flap forming kit 1000 of any one of embodiments 54 to 101, wherein said mud flap forming kit 1000 further comprises: packaging (not shown) to house/store the one or more mud flap components 20, one or more mud flap bodies 10, or any combination thereof.
103. The mud flap forming kit 1000 of any one of embodiments 54 to 102, wherein said one or more mud flap components 20, when combined with one another form a mud flap accessory 200, said mud flap accessory 200 having a mud flap accessory height $H_{FC}$, and a mud flap accessory width $W_{FC}$. See, for example, exemplary mud flap accessory 200 shown in FIGS. 4-7 and 9.
104. The mud flap forming kit 1000 of embodiment 103, wherein said mud flap accessory width $W_{FC}$ is equal to or greater than (i) an upper mud flap body edge length $L_{UE}$, (ii) a lower mud flap body edge length $L_{LE}$, or (iii) both (i) and (ii) of a mud flap body 10.
105. The mud flap forming kit 1000 of embodiment 103 or 104, wherein said mud flap accessory width $W_{FC}$ is greater than (i) an upper mud flap body edge length $L_{UE}$, (ii) a lower mud flap body edge length $L_{LE}$, or (iii) both (i) and (ii) of a mud flap body 10.
106. The mud flap forming kit 1000 of any one of embodiments 103 to 105, wherein said mud flap accessory width $W_{FC}$ is greater than both (i) an upper mud flap body edge length $L_{UE}$, and (ii) a lower mud flap body edge length $L_{LE}$ of a mud flap body 10.
107. The mud flap forming kit 1000 of any one of embodiments 103 to 106, wherein said mud flap accessory height $H_{FC}$ is at least 30% of a mud flap body height $H_{MF}$.
108. The mud flap forming kit 1000 of any one of embodiments 103 to 107, wherein said mud flap accessory height $H_{FC}$ is at least 50% of a mud flap body height $H_{MF}$.

109. The mud flap forming kit 1000 of any one of embodiments 103 to 108, wherein said mud flap accessory height $H_{FC}$ is at least 80% of a mud flap body height $H_{MF}$.

110. The mud flap forming kit 1000 of any one of embodiments 103 to 109, wherein said mud flap accessory height $H_{FC}$ is equal to or greater than a mud flap body height $H_{MF}$.

111. The mud flap forming kit 1000 of any one of embodiments 103 to 110, wherein said mud flap accessory height $H_{FC}$ is greater than a mud flap body height $H_{MF}$.

Mud Flap Accessories Formed From One or More Mud Flap Components

112. A mud flap accessory 200 comprising a combination of one or more mud flap components 20, each of the one or more mud flap components 20 independently comprising: horse hair 21, one or more leather fringe components 22, one or more synthetic leather fringe components 23, one or more fabric pieces 24, uni-directional fibers 255, a heat-treated fibrous web 265, one or more film pieces 25, one or more metal foil pieces 26, one or more laminates 27 comprising two or more of fabric pieces 24, film pieces 25, metal foil pieces 26, or any combination thereof, wherein the combination of the one or more mud flap components 20 (a) is attachable to a mud flap body 10 of the mud flap 100, and (b) when attached, extends beyond an outer side edge 13 of the mud flap body 10, an inner side edge 14 of the mud flap body 10, a lower mud flap body edge 12 of the mud flap body 10, or any combination thereof.

113. The mud flap accessory 200 of embodiment 112, said mud flap accessory 200 having a mud flap accessory height $H_{FC}$, and a mud flap accessory width $W_{FC}$. See, for example, exemplary mud flap accessory 200 shown in FIGS. 4-7 and 9. As shown in shown in FIGS. 4-7 and 9, mud flap accessory 200 typically extends along a perimeter of a given mud flap body 10, for example, along (i) lower mud flap body edge 12, and at least one of: (ii) outer side edge 13, and (iii) inner side edge 14, such that a central portion of the mud flap body 10 is not covered by the mud flap accessory 200.

114. The mud flap accessory 200 of embodiment 113, wherein said mud flap accessory width $W_{FC}$ is equal to or greater than (i) an upper mud flap body edge length $L_{UE}$, (ii) a lower mud flap body edge length $L_{LE}$, or (iii) both (i) and (ii) of a mud flap body 10.

115. The mud flap accessory 200 of embodiment 113 or 114, wherein said mud flap accessory width $W_{FC}$ is greater than (i) an upper mud flap body edge length $L_{UE}$, (ii) a lower mud flap body edge length $L_{LE}$, or (iii) both (i) and (ii) of a mud flap body 10.

116. The mud flap accessory 200 of any one of embodiments 113 to 115, wherein said mud flap accessory width $W_{FC}$ is greater than both (i) an upper mud flap body edge length $L_{UE}$, and (ii) a lower mud flap body edge length $L_{LE}$ of a mud flap body 10.

117. The mud flap accessory 200 of any one of embodiments 113 to 116, wherein said mud flap accessory height $H_{FC}$ is at least 30% of a mud flap body height $H_{MF}$.

118. The mud flap accessory 200 of any one of embodiments 113 to 117, wherein said mud flap accessory height $H_{FC}$ is at least 50% of a mud flap body height $H_{MF}$.

119. The mud flap accessory 200 of any one of embodiments 113 to 118, wherein said mud flap accessory height $H_{FC}$ is at least 80% of a mud flap body height $H_{MF}$.

120. The mud flap accessory 200 of any one of embodiments 113 to 119, wherein said mud flap accessory height $H_{FC}$ is equal to or greater than a mud flap body height $H_{MF}$.

121. The mud flap accessory 200 of any one of embodiments 113 to 120, wherein said mud flap accessory height $H_{FC}$ is greater than a mud flap body height $H_{MF}$.

122. The mud flap accessory 200 of any one of embodiments 112 to 121, wherein said mud flap accessory 200 comprises any of the features and/or components recited in any one of embodiments 1 to 111. For example, a given mud flap accessory 200 may comprise a combination of one or more of: horse hair 21, one or more leather fringe components 22, one or more synthetic leather fringe components 23, one or more fabric pieces 24, uni-directional fibers 255, a heat-treated fibrous web 265, one or more film pieces 25, one or more metal foil pieces 26, one or more laminates 27 comprising two or more of fabric pieces 24, film pieces 25, metal foil pieces 26, or any combination thereof, one or more attachment components 30 such as those described in embodiments 88 to 90, and one or more additional components such as those described in embodiment 87.

123. The mud flap accessory 200 of any one of embodiments 112 to 122, wherein said mud flap accessory 200, when attached to a mud flap body 10 of a mud flap 100, extends along (i) at least a portion of an outer side edge 13 of the mud flap body 10, (ii) at least a portion of an inner side edge 14 of the mud flap body 10, (iii) at least a portion of a lower mud flap body edge 12 of the mud flap body 10, or any combination thereof.

124. The mud flap accessory 200 of any one of embodiments 112 to 123, wherein said mud flap accessory 200, when attached to a mud flap body 10 of a mud flap 100, extends along (i) at least a portion of an outer side edge 13 of the mud flap body 10, and (ii) at least a portion of a lower mud flap body edge 12 of the mud flap body 10.

125. The mud flap accessory 200 of any one of embodiments 112 to 124, wherein said mud flap accessory 200, when attached to a mud flap body 10 of a mud flap 100, extends along (i) at least a portion of an outer side edge 13 of the mud flap body 10, (ii) at least a portion of an inner side edge 14 of the mud flap body 10, and (iii) at least a portion of a lower mud flap body edge 12 of the mud flap body 10.

126. The mud flap accessory 200 of any one of embodiments 112 to 125, wherein said mud flap accessory 200, when attached to a mud flap body 10 of a mud flap 100, extends along an entire length of a lower mud flap body edge 12 of the mud flap body 10.

127. The mud flap accessory 200 of any one of embodiments 112 to 126, wherein said mud flap accessory 200, when attached to a mud flap body 10 of a mud flap 100, extends along more than 50% and up to 100% of an entire length of an outer side edge 13 of the mud flap body 10.

128. The mud flap accessory 200 of any one of embodiments 112 to 127, wherein said mud flap accessory 200, when attached to a mud flap body 10 of a mud flap 100, extends along more than 50% and up to 100% of an entire length of an inner side edge 14 of the mud flap body 10.

129. The mud flap accessory 200 of any one of embodiments 112 to 128, wherein said combination of one or more mud flap components 20 are attached to one another to form from one to three mud flap accessory components 200'. See, for example, exemplary mud flap accessory 200 shown in FIG. 9, wherein exemplary mud flap accessory 200 comprises three mud flap accessory components 200' with one mud flap accessory component 200' extending along each side edge and a lower edge of exemplary mud flap body 10. In other embodiments, such as the exemplary mud flap accessory 200 shown in FIGS. 4-7, exemplary mud flap accessory 200 comprises a single mud flap accessory component 200' that extends along each side edge and a lower edge of exemplary mud flap body 10.

130. The mud flap accessory 200 of any one of embodiments 112 to 129, wherein said combination of one or more mud flap components 20 comprises uni-directional fibers 255, a heat-treated fibrous web 265, one or more film pieces 25, one or more metal foil pieces 26, one or more laminates 27 comprising two or more of fabric pieces 24, film pieces 25, metal foil pieces 26, or any combination thereof.

131. The mud flap accessory 200 of any one of embodiments 112 to 130, wherein said combination of one or more mud flap components 20 comprises uni-directional fibers 255, a heat-treated fibrous web 265, one or more metal foil pieces 26, or any combination thereof.

132. The mud flap accessory 200 of any one of embodiments 112 to 131, wherein said combination of one or more mud flap components 20 comprises uni-directional fibers 255, and one or more metal foil pieces 26.

133. The mud flap accessory 200 of any one of embodiments 112 to 131, wherein said combination of one or more mud flap components 20 comprises a heat-treated fibrous web 265, and one or more metal foil pieces 26. See, for example, exemplary mud flap accessory 200 shown in FIG. 9.

134. The mud flap accessory 200 of any one of embodiments 112 to 133, in combination with one or more attachment components 30 such as those described in embodiments 88 to 90.

135. The mud flap accessory 200 of any one of embodiments 112 to 134, in combination with a mud flap 100 such as those described in embodiments 1 to 53.

136. The mud flap accessory 200 of any one of embodiments 112 to 134, attached to a mud flap 100 such as those described in embodiments 1 to 53.

Methods of Making Mud Flaps

137. A method of making the mud flap 10 of any one of embodiments 1 to 53, said method comprising: attaching one or more mud flap components 20 to a mud flap body 10, the one or more mud flap components 20 comprising: horse hair 21, one or more leather fringe components 22, one or more synthetic leather fringe components 23, one or more fabric pieces 24, one or more film pieces 25, one or more metal foil pieces 26, one or more laminates 27 comprising two or more fabric pieces 24, uni-directional fibers 255, a heat-treated fibrous web 265, film pieces 25, metal foil pieces 26, or any combination thereof, wherein at least one of the one or more mud flap components 20, when attached to the mud flap body 10, extends beyond the outer side edge 13, the inner side edge 14, the lower mud flap body edge 12, or any combination thereof, of the mud flap body 10.

138. The method of embodiment 137, wherein said attaching step comprises attaching uni-directional fibers 255, and/or a heat-treated fibrous web 265 to the mud flap body 10.

139. The method of embodiment 137 or 138, wherein said attaching step comprises attaching a heat-treated fibrous web 265 to the mud flap body 10.

140. The method of any one of embodiments 137 to 139, wherein said attaching step comprises attaching one or more fabric pieces 24, one or more film pieces 25, one or more metal foil pieces 26, one or more laminates 27 comprising two or more fabric pieces 24, film pieces 25, metal foil pieces 26, or any combination thereof, to the mud flap body 10.

141. The method of any one of embodiments 137 to 140, wherein said attaching step comprises attaching any (i) one or (ii) combination of the one or more mud flap components 20 described in any one of embodiments 1 to 136 to the mud flap body 10.

142. The method of any one of embodiments 137 to 141, wherein said attaching step further comprises attaching one or more metal ornaments, one or more plastic ornaments, one or more metal stars, one or more plastic stars, one or more metal beads, one or more plastic beads, one or more western-style metal components, one or more western-style plastic components, one or more cowboy-themed metal components, one or more cowboy-themed plastic components, one or more lights, one or more electrical wires, one or more electrical connectors, one or more light reflectors, or any combination thereof (not shown), to the mud flap body 10.

143. The method of any one of embodiments 137 to 142, wherein said attaching step comprises utilizing one or more attachment components 30 to connect the one or more mud flap components 20 to the mud flap body 10.

144. The method of embodiment 143, wherein said utilizing step comprises using metal rivets 31, adhesive, double-sided adhesive tape 35, screws, stitching, or any combination thereof, to attach the one or more mud flap components 20 to the mud flap body 10.

145. The method of any one of embodiments 137 to 144, further comprises: packaging the mud flap 100 within suitable packaging material (not shown) for shipping.

Methods of Using Mud Flaps and Mud Flap Kits

146. A method of using the mud flap 100 of any one of embodiments 1 to 53, said method comprising: positioning the mud flap 100 on a vehicle (not shown) so as to extend vertically behind a wheel of the vehicle.

147. A method of using the mud flap forming kit 1000 of any one of embodiments 54 to 111, said method comprising: attaching the one or more mud flap components 20 to a mud flap body 10 of a mud flap 100, the mud flap 100 being (a) connectable to a vehicle (not shown) or (b) attached to a vehicle (not shown) so as to extend vertically behind a wheel of the vehicle.

148. A method of using the mud flap accessory 200 of any one of embodiments 112 to 136, said method comprising: attaching the mud flap accessory 200 to a mud flap body 10 of a mud flap 100, the mud flap 100 being (a) connectable to a vehicle (not shown) or (b) attached to a vehicle (not shown) so as to extend vertically behind a wheel of the vehicle.

149. The method of embodiment 147 or 148, wherein the mud flap 100 is attached to a vehicle (not shown) so as to extend vertically behind a wheel of the vehicle.

150. The method of any one of embodiments 146 to 149, wherein the vehicle comprises a truck, a car, a bus, a recreational vehicle (RV), a sport utility vehicle (SUV), or any other passenger vehicle having an enclosed passenger compartment and three or more wheels.

151. The method of any one of embodiments 146 to 150, wherein the vehicle comprises a school bus.

152. The method of any one of embodiments 146 to 151, wherein the vehicle comprises a truck having from 4 to 18 wheels.

153. The method of any one of embodiments 146 to 152, wherein the vehicle comprises a truck having 18 wheels.

The present invention is described above and further illustrated below by way of examples, which are not to be construed in any way as imposing limitations upon the scope of the invention. On the contrary, it is to be clearly understood that resort may be had to various other embodiments, modifications, and equivalents thereof which, after reading the description herein, may suggest themselves to those skilled in the art without departing from the spirit of the present invention and/or the scope of the appended claims.

Example 1

Preparation of a Mud Flap

Exemplary mud flaps 100, mud flap forming kits 1000, and mud flap accessories 200 having one of more features (i) as shown in FIGS. 1-10B and/or (ii) as described in embodiments 1 to 153 above were prepared using conventional steps (e.g., at least one of: a thermoforming step, a machining step, a molding step, an extrusion step, a cutting step, a stamping/punching step, a connecting step, a heat-treating step (e.g., exposing a substrate or component to heat so as to shrink, melt, and/or bond components to one another), and/or an assembling step, etc.).

It should be understood that although the above-described mud flaps, mud flap kits, mud flap accessories, and/or methods are described as "comprising" one or more components or steps, the above-described mud flaps, mud flap kits, mud flap accessories, and/or methods may "comprise," "consists of," or "consist essentially of" any of the above-described components, features, or steps of the mud flaps, mud flap kits, mud flap accessories, and/or methods. Consequently, where the present invention, or a portion thereof, has been described with an open-ended term such as "comprising," it should be readily understood that (unless otherwise stated) the description of the present invention, or the portion thereof, should also be interpreted to describe the present invention, or a portion thereof, using the terms "consisting essentially of" or "consisting of" or variations thereof as discussed below.

As used herein, the terms "comprises," "comprising," "includes," "including," "has," "having," "contains," "containing," "characterized by" or any other variation thereof, are intended to encompass a non-exclusive inclusion, subject to any limitation explicitly indicated otherwise, of the recited components. For example, a mud flap, a mud flap kit, a mud flap accessory, and/or method that "comprises" a list of elements (e.g., components, features, or steps) is not necessarily limited to only those elements (or components or steps), but may include other elements (or components or steps) not expressly listed or inherent to the mud flap, the mud flap kit, the mud flap accessory, and/or method.

As used herein, the transitional phrases "consists of" and "consisting of" exclude any element, step, or component not specified. For example, "consists of" or "consisting of" used in a claim would limit the claim to the components, materials, or steps specifically recited in the claim except for impurities ordinarily associated therewith (i.e., impurities within a given component). When the phrase "consists of" or "consisting of" appears in a clause of the body of a claim, rather than immediately following the preamble, the phrase "consists of" or "consisting of" limits only the elements (or components or steps) set forth in that clause; other elements (or components) are not excluded from the claim as a whole.

As used herein, the transitional phrases "consists essentially of" and "consisting essentially of" are used to define a mud flap, a mud flap kit, a mud flap accessory, and/or method that includes materials, steps, features, components, or elements, in addition to those literally disclosed, provided that these additional materials, steps, features, components, or elements do not materially affect the basic and novel characteristic(s) of the claimed invention. The term "consisting essentially of" occupies a middle ground between "comprising" and "consisting of."

Further, it should be understood that the herein-described mud flaps, mud flap kits, mud flap accessories, and/or methods may comprise, consist essentially of, or consist of any of the herein-described components and features, as shown in the figures with or without any feature(s) not shown in the figures. In other words, in some embodiments, the mud flaps, mud flap kits, the mud flap accessories, and/or methods of the present invention do not have any additional features other than those shown in the figures, and such additional features, not shown in the figures, are specifically excluded from the mud flaps, the mud flap kits, the mud flap accessories, and/or methods. In other embodiments, the mud flaps, mud flap kits, mud flap accessories, and/or methods of the present invention do have one or more additional features that are not shown in the figures.

While the specification has been described in detail with respect to specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

What is claimed is:

1. A mud flap accessory comprising (i) a heat-treated fibrous web comprising an elongated strip of void-containing fibrous material comprising fibers that have been shrunken, melted, and bonded to one another, and (ii) double-sided adhesive tape for attaching the heat-treated fibrous web to a mud flap body of a mud flap, wherein the heat-treated fibrous web (a) is attachable to the mud flap body of the mud flap via the double-sided adhesive tape, and (b) when attached to the mud flap body, extends beyond (i) an outer side edge of the mud flap body, (ii) a first corner of the mud flap body separating the outer side edge of the mud flap body and a lower mud flap body edge of the mud flap body, (iii) the lower mud flap body edge of the mud flap body, (iv) a second corner separating the lower mud flap body edge of the mud flap body and an inner side edge of the mud flap body, and (v) the inner side edge of the mud flap body so that a central portion of the mud flap body is not covered by the mud flap accessory.

2. The mud flap accessory of claim 1, said mud flap accessory has a mud flap accessory height ($H_{FC}$), and a mud flap accessory width ($W_{FC}$), and wherein said mud flap accessory width ($W_{FC}$) is greater than (i) an upper mud flap body edge length ($L_{UE}$), and (ii) a lower mud flap body edge length ($L_{LE}$) of the mud flap body.

3. The mud flap accessory of claim 2, wherein said mud flap accessory height ($H_{FC}$) is at least 80% of a mud flap body height ($H_{MF}$).

4. The mud flap accessory of claim 2, wherein said mud flap accessory height ($H_{FC}$) is equal to or greater than a mud flap body height ($H_{MF}$).

5. The mud flap accessory of claim 1, in combination with the mud flap.

6. The mud flap accessory of claim 1 attached to the mud flap.

7. A mud flap forming kit comprising the mud flap accessory and the double-sided adhesive tape of claim 1, and metal rivets for attaching the mud flap accessory to the mud flap body.

8. A mud flap forming kit comprising the mud flap accessory, the mud flap, and the double-sided adhesive tape of claim 5, and metal rivets for attaching the mud flap accessory to the mud flap body.

9. A mud flap accessory comprising one to three mud flap components, each of the one to three mud flap components independently comprising: a heat-treated fibrous web comprising an elongated strip of void-containing fibrous material comprising fibers that have been shrunken, melted, and bonded to one another, wherein the one to three mud flap components are (a) attachable to a mud flap body of a mud flap, and (b) when attached to the mud flap body, extend along (i) an outer side edge of the mud flap body, (ii) a first corner of the mud flap body separating the outer side edge of the mud flap body and a lower mud flap body edge of the mud flap body, (iii) the lower mud flap body edge of the mud flap body (iv) a second corner separating the lower mud flap body edge of the mud flap body and an inner side edge of the mud flap body, and (v) the inner side edge of the mud flap body so that a central portion of the mud flap body is not covered by the mud flap accessory.

10. The mud flap accessory of claim 9, in combination with the mud flap.

11. The mud flap accessory of claim 10 attached to the mud flap.

12. The mud flap accessory of claim 9, further comprising: double-sided adhesive tape and metal rivets for attaching the mud flap accessory to the mud flap body.

13. The mud flap accessory of claim 9, said mud flap accessory has a mud flap accessory height ($H_{FC}$), and a mud flap accessory width ($W_{FC}$), and wherein said mud flap accessory width ($W_{FC}$) is equal to or greater than (i) an upper mud flap body edge length ($L_{UE}$), and (ii) a lower mud flap body edge length ($L_{LE}$) of the mud flap body.

14. The mud flap accessory of claim 9, said mud flap accessory has a mud flap accessory height ($H_{FC}$), and a mud flap accessory width ($W_{FC}$), and wherein said mud flap accessory width ($W_{FC}$) is equal to a lower mud flap body edge length ($L_{LE}$) of the mud flap body.

15. The mud flap accessory of claim 9, said mud flap accessory has a mud flap accessory height ($H_{FC}$), and a mud flap accessory width ($W_{FC}$), and wherein said mud flap accessory width ($W_{FC}$) is greater than a lower mud flap body edge length ($L_{LE}$) of the mud flap body.

16. A mud flap forming kit comprising the mud flap accessory of claim 9, metal rivets, and double-sided adhesive tape for attaching the mud flap accessory to the mud flap body.

17. A mud flap forming kit comprising:
(1) a mud flap accessory comprising one or more strips of heat-treated fibrous web, each strip of heat-treated fibrous web comprising an elongated strip of void-containing fibrous material comprising fibers that have been shrunken, melted, and bonded to one another;
(2) double-sided adhesive tape for attaching the mud flap accessory to a mud flap body of the mud flap; and
(3) metal rivets for attaching the mud flap accessory to the mud flap body of the mud flap,
wherein the mud flap accessory is (a) attachable to the mud flap body of the mud flap, and (b) when attached to the mud flap body, extends along a perimeter of the mud flap body, the perimeter comprising (i) an inner side edge of the mud flap body, (ii) a first corner separating the inner side edge of the mud flap body and a lower mud flap body edge, (iii) the lower mud flap body edge, (iv) a second corner separating the lower mud flap body edge and an outer side edge of the mud flap body, and (v) the outer side edge of the mud flap body so that a central portion of the mud flap body is not covered by the mud flap accessory.

18. The mud flap forming kit of claim 17, wherein said one or more strips of heat-treated fibrous web comprises a single strip of heat-treated fibrous web.

19. The mud flap forming kit of claim 17, said mud flap accessory has a mud flap accessory height ($H_{FC}$), and a mud flap accessory width ($W_{FC}$), and wherein said mud flap accessory width ($W_{FC}$) is equal to a lower mud flap body edge length ($L_{LE}$) of the mud flap body.

\* \* \* \* \*